United States Patent

March

[11] Patent Number: 5,161,903
[45] Date of Patent: Nov. 10, 1992

[54] INTERMEDIATE DRIVE SHAFT SUPPORT UTILIZING A STANDARD BEARING

[75] Inventor: Gary L. March, Defiance, Ohio

[73] Assignee: The Zeller Corporation, Defiance, Ohio

[21] Appl. No.: 592,127

[22] Filed: Oct. 3, 1990

[51] Int. Cl.⁵ .......................... F16C 27/06; F16C 33/76
[52] U.S. Cl. ...................................... 384/536; 384/478
[58] Field of Search ............... 384/477, 487, 488, 535, 384/536, 537, 569, 581, 582, 584, 585, 626

[56] References Cited

U.S. PATENT DOCUMENTS

| | | |
|---|---|---|
| 1,423,950 | 7/1922 | Leon . |
| 2,467,994 | 4/1949 | Ruist . |
| 3,306,680 | 2/1967 | Bruyere . |
| 3,365,032 | 1/1968 | Gorndt . |
| 3,704,922 | 12/1972 | Kleinschmidt et al. . |
| 4,392,694 | 7/1983 | Reynolds ........................... 384/536 |
| 4,571,098 | 2/1986 | Rudnik ............................ 384/536 X |
| 4,865,470 | 9/1989 | Mazziotti ........................... 384/478 |

FOREIGN PATENT DOCUMENTS 527351  10/1940  United Kingdom ................ 384/536

Primary Examiner—Thomas R. Hannon
Attorney, Agent, or Firm—Allen D. Gutchess, Jr.

[57] ABSTRACT

An intermediate bearing support for a drive shaft of a vehicle is required when three or more universal joints are embodied in a driveline between a transmission and a differential. Special bearings of particular dimensions and having wider inner races than outer race have heretofore been employed for this particular application. Such bearings are substantially more costly than standard ones. The new drive shaft support uses standard bearings with special adapter components for use with the supports. The adapter components include special adapter rings located between the inner race of the bearing and the shaft being supported. In most instances, adapter rings are also located around the outer race between the outer race and a grease retainer and rubber mounted block of the support.

3 Claims, 1 Drawing Sheet

INTERMEDIATE DRIVE SHAFT SUPPORT UTILIZING A STANDARD BEARING

This invention relates to an intermediate support for a drive shaft utilizing special adapter components and standard bearings.

In some drivelines, three or more universal joints are required between the transmission and the rear axle differential because a single, straight shaft cannot be used. Also, particularly in larger vehicles, the drive or propeller shaft may be sufficiently long that it tends to flex or whip to an objectionable extent. In either of these applications an intermediate shaft support for the driveline is employed.

An intermediate support for a drive shaft commonly includes a special ball bearing with an inner race which is wider than the outer race, with the inner race being mounted on the shaft. The special bearings employed with these intermediate supports are considerably more costly than standard bearings, being about three times as much in one instance, for example. A grease retainer or shield is located around the outer race of the bearing and is mounted in a molded rubber cushion block. A hanger is located around the cushion block and is mounted on suitable framework of the vehicle. Typically, flingers are located on each side of the bearing, being mounted on spaced portions of the drive shaft.

The new intermediate drive shaft support in accordance with the invention employs special adapter components to enable the drive shaft support to employ standard bearings rather than the special ones. The adapter components for the drive shaft support include two adapter rings, each of which has a cylindrical portion located between the inner race of the bearing and the drive shaft which is about half the width of the inner race, and an outwardly-extending annular shoulder extending outwardly beyond the outer, annular edge of the inner race. In most instances, the adapter components also include two outer rings, each of which has a cylindrical portion located between the outer race of the bearing and the grease retainer and rubber mounting block. Each ring also has an inwardly-extending annular shoulder extending inwardly at the outer annular edge of the outer race. In some instances, a stamped adapter component can be used around the outer race and has an inwardly-extending shoulder at one end which extends inwardly along only one annular edge of the outer race.

The intermediate shaft support also has the grease retainer or shield made in two halves which extend inwardly around the outer race and toward the inner race to provide an annular grease chamber for rolling elements in the form of balls or rollers located between the inner and outer races.

It is, therefore, a principal object of the invention to provide an intermediate support for a drive shaft employing a standard bearing.

Another object of the invention is to provide intermediate supports for drive shafts employing adapter components which enable the supports to be used with standard bearings.

Many other objects and advantages of the invention will be apparent from the following detailed description of preferred embodiments thereof, reference being made to the accompanying drawings, in which.

Figure 1:
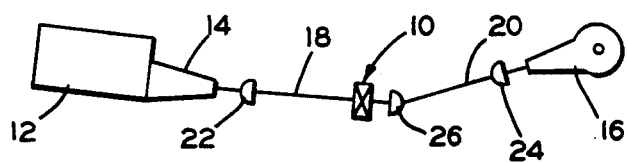
FIG. 1 is a schematic view in elevation of a driveline of a vehicle with which the drive shaft support in accordance with the invention is used.

Referring to FIG. 1, a drive shaft support 10 is shown in a typical application. A vehicle engine 12 with a transmission 14 is connected to a rear axle differential 16 by front and rear drive shafts 18 and 20. A forward universal joint 22 connects the shaft 18 with the transmission 14 and a rear universal joint 24 connects the rear drive shaft 20 with the differential 16. The shafts 18 and 20 are connected by an intermediate universal joint 26. The drive shaft support 10 is required to provide an intermediate support for the drive shaft and specifically supports the rear portion of the front drive shaft 18, in this instance, near the intermediate universal joint 26. The drive shaft supports 10 are also used on single, straight drive shafts of substantial length, to prevent excessive flexing or whipping during operation.

Figure 3:
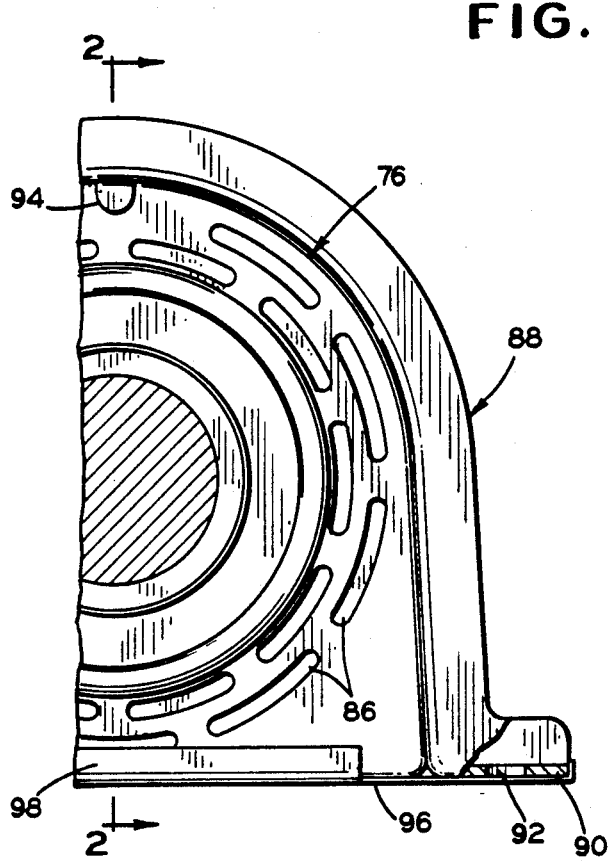
FIG. 3 is a side view in elevation of the shaft support of FIG. 2.
Figure 2:
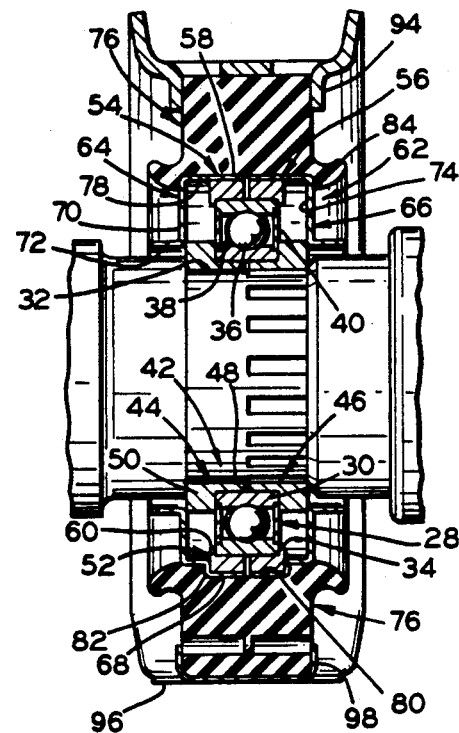
FIG. 2 is an enlarged view in cross section, taken along the line 2—2 of FIG. 3 of the drive shaft support of FIG. 1.

Referring to FIGS. 2 and 3, the shaft support 10 is shown employed with a standard bearing 28 having an inner race 30 with an inner diameter of predetermined value located around a stub shaft 32 forming an end portion of the drive shaft 18. The bearing further includes an outer race 34 with an outer diameter of predetermined value, rolling elements 36, shown as bearing balls, a cage 38, and an inner grease retainer 40.

The inner race 30 and the outer race 34 are of equal width, being part of the standard bearing 28. Heretofore, intermediate drive shaft supports have employed bearings with special wide inner races, as shown, for example, in U.S. Pat. No. 4,865,470, issued Sep. 12, 1989, and assigned to the assignee of this patent application. Such special bearings are considerably more costly than standard ones and may not be as readily or as quickly available as standard ones.

In accordance with the invention, adapter means in the form of an inner race adapter 42 is employed with the inner race 30. The adapter 42 includes two adapter rings or components 44 and 46 which can be identical. Each of the adapter rings includes a cylindrical portion 48 which is located between the inner race 30 and the shaft 32. Each of the components 44 and 46 also includes an outer, outwardly-extending, annular shoulder portion 50 which is structurally integral with the cylindrical portion 48 and extends outwardly along at least a portion of the outer annular edge of the inner race 30.

An outer race adapter 52, in this instance, is located around the outer race 34. It includes two symmetrical rings or components 54 and 56. Each of these comprises a cylindrical portion 58 and an inwardly-extending, annular shoulder 60 which extends along a portion of the outer annular edge of the outer race 34.

An outer grease retainer 62 is located around the outer race 34 and the outer adapter 52. The retainer 62 is formed of two symmetrical halves 64 and 66. Each of these includes a cylindrical portion 68 which extends around and beyond the outer adapter 52. Each of the halves further includes a structurally-integral, annular inwardly-extending portion 70 which extends substantially to the edge of the inner adapter 42 and then terminates in an axially-extending flange 72. As such, the retainer 62 provides an effective lubricant chamber 74 essentially surrounding the bearing 28.

A molded rubber cushion block 76 surrounds the bearing 28 and the retainer 62 and isolates the bearing and the shaft from the vehicle frame. The cushion block has an annular recess 78 which receives the retainer 62 and has recesses 80 (FIG. 2) which receive offsets 82 of the retainer halves 64 and 66 to prevent the retainer from rotating in the cushion block. The cushion block 76 also has annular axially-extending flanges 84 which provide some protection against dirt and dust for the bearing 28. Staggered, arcuate slots or recesses 86 are also molded into the cushion block to provide more effective isolation of the bearing and the shaft from the vehicle frame, as is known in the art. Outer bearing shields or flingers (not shown) can also be employed at the sides of the drive shaft support 10, as is also known in the art.

A bracket or hanger 88 (FIG. 3) is of U-shaped configuration and receives the periphery of the cushion block 76. The bracket has mounting flanges 90 with elongate openings 92 by means of which the hanger and support can be adjustably mounted relative to a vehicle frame. At a central portion, the bracket 88 has ears 94 extending inwardly to help hold the cushion block 76 in position. In this instance, an elongate mounting plate 96 extends between the mounting flanges 90 and has side flanges 98 extending on either side of the cushion block 76. As shown, the bracket 88 is upside down from its normal operating position.

Figure 4:
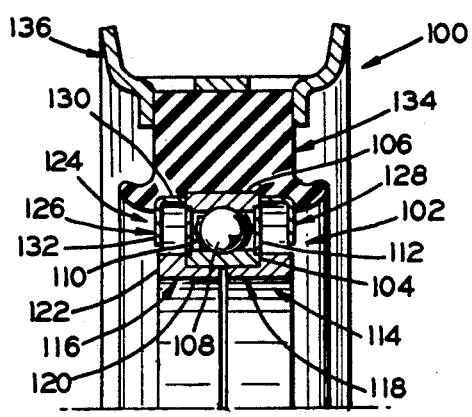
FIG. 4 is an enlarged view in transverse cross section similar to FIG. 3 of one-half of a modified drive shaft support.

Referring to FIG. 4, a modified drive shaft support 100 is generally similar to the drive shaft support 10 but is used with a different diameter shaft (not shown) and a different size of standard ball bearing indicated at 102. The bearing 102 has an inner race 104, an outer race 106, rolling elements 108, a cage 110, and an inner grease retainer 112.

In accordance with the invention, an inner race adapter 114 is employed with the inner race 104. The adapter includes two adapter rings or components 116 and 118 which can be identical. Each of the adapter rings includes a cylindrical portion 120 which is located between the inner race 104 and the shaft. Each of the components 116 and 118 also includes an outer, outwardly-extending, annular shoulder portion 122 which is structurally-integral with the cylindrical portion 120 and extends outwardly along at least a portion of the outer annular edge of the inner race 104. In this instance, because of the dimensions, no outer adapter is employed.

An outer grease retainer 124 includes two symmetrical halves 126 and 128 which are located at the sides of the outer race 106. Each of the halves 126 and 128 includes a cylindrical portion 130 which is located to the side of the outer race 106 and a structurally-integral, annular inwardly-extending portion 132 which extends substantially to the edge of the inner adapter 114. As such, the retainer 124 provides an effective lubricant chamber essentially surrounding the bearing.

A molded rubber cushion block 134 surrounds the bearing 102 and is similar in design to the cushion block 76. A bracket or hanger 136 receives the cushion block 134 and can be affixed to the vehicle frame, similar to the bracket 88 of FIGS. 2 and 3.

Figure 5:
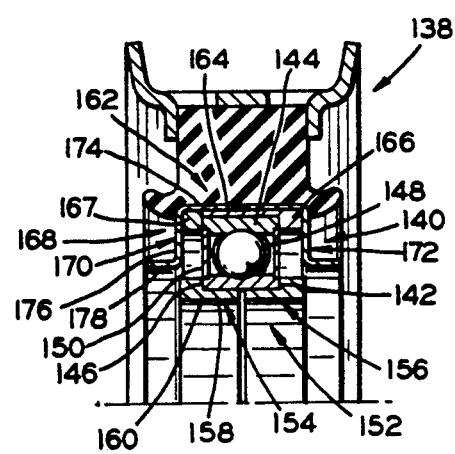
FIG. 5 is a view similar to FIG. 4 of a further modified drive shaft support.

Referring now to FIG. 5, a drive shaft support 138 is similar to the shaft supports 10 and 100 except for certain shaft and bearing sizes. The support 138 includes a standard bearing 140 having an inner race 142, an outer race 144 of equal widths, rolling elements 146, a cage 148, and an inner grease retainer 150. In accordance with the invention, an inner race adapter 152 is employed with the inner race 142. The adapter includes two adapter rings or components 154 and 156 which can be identical. Each of the adapter rings includes a cylindrical portion 158 which is located between the inner race 142 and the shaft. Each of the components 154 and 156 also includes an outer, outwardly-extending, annular shoulder portion 160 which is structurally-integral with the cylindrical portion 158 and extends outwardly along at least a portion of the outer annular edge of the inner race 142.

An outer adapter 162, in this instance, is located around the outer race 144. It includes a cylindrical portion 164 which extends around the outer race 144 and an inwardly-extending, annular shoulder 166 which extends inwardly along one outer annular edge of the outer race 144. A spacing ring 167 can be located along the other annular edge of the outer race 144. The outer adapter 162 can be formed by stamping or cold forming when thinner or may be turned from tubing. It can be press fit on the outer race 144.

An outer grease retainer 168 is located around the outer race 144 and the outer adapter 162. The retainer again includes two symmetrical halves 170 and 172, each of which includes a cylindrical portion 174 which extends around the outer adapter 162. Each of the halves further includes a structurally-integral annular inwardly-extending portion 176 which extends to near the edges of the inner adapter 152 and then terminates in an outwardly-extending flange 178. As such, the retainer 168 provides an effective lubricant chamber essentially surrounding the bearing 140.

It will be seen from the above, that the invention provides adapters, including adapter components, to enable standard bearings to be employed with particular drive shaft supports. The adapter components can be used in various combinations to accommodate standard bearings for the particular drive shaft applications. As discussed above, the standard bearings are substantially lower in cost and are often more readily available than the special bearings heretofore employed.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. A shaft support for a shaft of a driveline of a vehicle, said shaft support comprising a standard bearing having an inner race with an inner diameter of predetermined value and an outer race with an outer diameter of predetermined value, and bearing elements between said inner and outer races, a grease retainer of generally U-shaped transverse cross section located around said outer race, a resilient cushion block extending around said retainer, a supporting bracket extending around said cushion block and having means to attach said bracket to a portion of the vehicle, and an inner adapter comprising two separate parts, each having a cylindrical portion contacting an inner surface of the inner race and having a shoulder portion extending along an edge portion of said inner race, an outer adapter including a cylindrical portion contacting the outer surface of said outer race and being located between said outer race and said grease retainer, said outer adapter further including an inwardly-extending, annular shoulder extending inwardly along an edge of said outer race, said grease retainer having inwardly-extending portions which are spaced apart a distance substantially equal to the distance between the shoulder portions of said inner adapter to form a grease chamber around said bearing elements.

2. A shaft support according to claim 1 wherein said outer adapter includes two separate components, each having a cylindrical portion contacting an outer surface of said outer race and having a shoulder portion extending along an edge portion of said outer race.

3. In combination, a shaft of a driveline of a vehicle, a shaft support for said shaft, said support comprising a standard bearing having an inner race with an inner diameter of predetermined value and an outer race with an outer diameter of predetermined value, said inner and outer races being substantially equal in width, and bearing elements located between said inner and outer races, said inner race being positioned around said shaft, an inner adapter for said inner race, said adapter comprising two components, each of said components having a cylindrical portion positioned between the inner surface of said inner race and the outer surface of said shaft, and each of said components further having an outwardly-extending annular shoulder extending outwardly from the cylindrical portion along an outer edge of said inner race, a grease retainer located on either side of said outer race, said grease retainer comprising two symmetrical components located at least at edge portions of said outer race and having portions extending inwardly toward the shaft to provide an annular grease retaining chamber around said bearing, said portions of said grease retainer being spaced apart a distance substantially equal to the width of said inner adapter to form a grease chamber around said bearing elements, an outer adapter located around said outer race, said outer adapter comprising two components, each of which has a substantially cylindrical portion located around said outer race and an annular shoulder extending inwardly along an outer edge of said outer race, and a rubber cushion block located around said outer race.

* * * * *